US010963312B2

(12) United States Patent
Cecil

(10) Patent No.: US 10,963,312 B2
(45) Date of Patent: Mar. 30, 2021

(54) GENERATION OF UNIQUE ORDERING OF EVENTS AT CLOUD SCALE

(71) Applicant: INTERNATIONAL BUSINESS MACHINES CORPORATION, Armonk, NY (US)

(72) Inventor: Roy R Cecil, Lisbon (PT)

(73) Assignee: International Business Machines Corporation, Armonk, NY (US)

(*) Notice: Subject to any disclaimer, the term of this patent is extended or adjusted under 35 U.S.C. 154(b) by 11 days.

(21) Appl. No.: 16/193,062

(22) Filed: Nov. 16, 2018

(65) Prior Publication Data

US 2020/0159593 A1 May 21, 2020

(51) Int. Cl.
*G06F 9/50* (2006.01)
*G06F 9/48* (2006.01)
*G06F 9/54* (2006.01)

(52) U.S. Cl.
CPC .......... *G06F 9/5072* (2013.01); *G06F 9/4881* (2013.01); *G06F 9/505* (2013.01); *G06F 9/542* (2013.01); *G06F 9/541* (2013.01)

(58) Field of Classification Search
CPC ............................. G06F 9/5072; G06F 9/4881
USPC .................................................. 718/101–108
See application file for complete search history.

(56) References Cited

U.S. PATENT DOCUMENTS

| 7,801,846 | B2 | 9/2010 | Devine et al. |
| 8,650,155 | B2 | 2/2014 | Corbin et al. |
| 8,671,074 | B2 * | 3/2014 | Wang ...................... G06F 9/466 707/634 |
| 8,744,937 | B2 * | 6/2014 | Seubert .................. G06Q 10/10 705/35 |
| 9,229,970 | B2 | 1/2016 | Grosman et al. |

(Continued)

FOREIGN PATENT DOCUMENTS

EP 1412858 B1 4/2018

OTHER PUBLICATIONS

Ofek, Yoram. "Generating a fault-tolerant global clock using high-speed control signals for the MetaNet architecture." IEEE Transactions on Communications 42.5 (1994): pp. 2179-2188. (Year: 1994).*

(Continued)

*Primary Examiner* — Satish Rampuria
(74) *Attorney, Agent, or Firm* — Erik K. Johnson

(57) ABSTRACT

Method and system are provided for generation of unique ordering of events at cloud scale. The method may include generating a single thread global number sequence at a generator at a controlled frequency of number generation; partitioning the global number sequence into multiple partitions with each partition having a derived stream with an ordered corresponding value provided in each stream of a set of corresponding values. The method may include transmitting ordered corresponding values of a set from an outbound queue of each partition to each partition. The method may include determining that all the ordered corresponding values of a set have been received back. The method uses valid ordered corresponding values as global sequence numbers to provide a distributed clock across the remote participating clusters, where a valid ordered corresponding value is a member of a set of corresponding values that have all been received at their respective receivers.

19 Claims, 14 Drawing Sheets

(56) References Cited

U.S. PATENT DOCUMENTS

| | | | |
|---|---|---|---|
| 9,495,381 B2 | 11/2016 | Shvachko et al. | |
| 9,672,082 B2 | 6/2017 | Thukkaram et al. | |
| 10,212,226 B2 | 2/2019 | Johnson | |
| 2007/0239758 A1* | 10/2007 | Devine | G06F 16/2343 |
| 2009/0144338 A1* | 6/2009 | Feng | G06F 16/273 |
| 2011/0251997 A1* | 10/2011 | Wang | G06F 11/2097 |
| | | | 707/634 |

OTHER PUBLICATIONS

Mannila, Heikki, and Christopher Meek. "Global partial orders from sequential data." Proceedings of the sixth ACM SIGKDD international conference on Knowledge discovery and data mining. 2000.pp. 161-168 (Year: 2000).*

Hrischuk, Curtis E., C. Murray Woodside, and Jerome A. Rolia. "Trace-based load characterization for generating performance software models." IEEE Transactions on software engineering 25.1 (1999): pp. 122-135. (Year: 1999).*

Gogouvitis, Spyridon V., et al. "A monitoring mechanism for storage clouds." 2012 Second International Conference on Cloud and Green Computing. IEEE, 2012.pp. 153-159 (Year: 2012).*

Reiss, Charles, et al. "Heterogeneity and dynamicity of clouds at scale: Google trace analysis." Proceedings of the Third ACM Symposium on Cloud Computing. 2012.pp. 1-13 (Year: 2012).*

Qian, Zhengping, et al. "Timestream: Reliable stream computation in the cloud." Proceedings of the 8th ACM European Conference on Computer Systems. 2013.pp. 1-14 (Year: 2013).*

Vogels, Werner, et al. "The design and architecture of the Microsoft Cluster Service-a practical approach to high-availability and scalability." Digest of Papers. Twenty-Eighth Annual International Symposium on Fault-Tolerant Computing (Cat. No. 98CB36224). IEEE, 1998.pp. 1-10 (Year: 1998).*

Vo, Hoang Tam, et al. "LogBase: a scalable log-structured database system in the cloud." arXiv preprint arXiv:1207.0140 (2012). pp.1004-1015 (Year: 2012).*

Makanju, Adetokunbo, et al. "Logview: Visualizing event log clusters." 2008 Sixth Annual Conference on Privacy, Security and Trust. IEEE, 2008.pp. 99-108 (Year: 2008).*

Chen, "FlashLogging: Exploiting Flash Devices for Synchronous Logging Performance", SIGMOD '09, Jun. 29-Jul. 2, 2009, pp. 73-86, Providence, RI, USA.

IBM, et al., "Recovery of Data Sharing Systems in the Absence of a Synchronized Clock", IP.com Prior Art Database Technical Disclosure, Jun. 1, 1993, 5 pages.

Mell et al., "The NIST Definition of Cloud Computing", National Institute of Standards and Technology, Special Publication 800-145, Sep. 2011, pp. 1-7.

* cited by examiner

GENERATION OF UNIQUE ORDERING OF EVENTS AT CLOUD SCALE

BACKGROUND

The present invention relates to a generation of unique ordering of events and more specifically, to unique ordering of events at a cloud scale.

In many contexts one needs to order events. A good example of this is logging in the context of a database server. Logging is a time ordered sequence of events and is fundamental to a database server. Databases order events on a server by using a Log Sequence Number (LSN), which is a monotonically increasing sequence of numbers, which indexes every log record in a database (UNDO and REDO logs). If two log records L1 and L2 have LSN numbers lsn1 and lsn2 such that lsn1<lsn2, then it is known that the event represented by L1 happened earlier than the event happened at L2.

However, in clustered databases each member of the cluster has its own sequence of numbers (LSN) for its log stream and that alone cannot order events in the cluster. In order to maintain the time order of events another level of ordering is needed.

One approach is to designate one member of the cluster as the Master and all other members to obtain the LSN from this member. A second approach is to have a centralized specialized node generating a unique number for every disk write. These approaches bring problems when expanded to cloud scale. Both approaches would mean that access to a centralized node is required before a log record can be written down to disk.

Global ordering of events is often required. The construction of atomic clock infrastructures has a prohibitively high cost and such infrastructures are hard to build. Also, atomic clock infrastructures require many reliable components and it is hard to guarantee reliability across all these components including: time servers, atomic clocks, cooling, radio antennas, radio interference, etc.).

SUMMARY

According to an aspect of the present invention there is provided a computer-implemented method for generation of unique ordering of events at cloud scale, comprising: generating a single thread global number sequence at a generator at a controlled frequency of number generation; partitioning the global number sequence into multiple partitions with one partition for each remote participating cluster and each partition having a derived stream with an ordered corresponding value provided in each stream of a set of corresponding values; transmitting ordered corresponding values of a set from an outbound queue of each partition to a receiver at each partition's remote participating cluster and receiving the ordered corresponding values at an inbound queue of each partition; determining that all the ordered corresponding values of a set are received back in order to result in valid ordered corresponding values; and using valid ordered corresponding values as global sequence numbers to provide a distributed clock across the remote participating clusters, wherein a valid ordered corresponding value is a member of a set of corresponding values that have all been received at their respective receivers.

According to another aspect of the present invention there is provided a computer-implemented method for generation of unique ordering of events at cloud scale carried out at a receiver at a remote participating cluster, comprising: receiving one of a set of ordered corresponding values at an inbound queue at the receiver from a remote sequence generator; placing the value on an outbound queue for return to the generator; wherein the set of ordered corresponding values are from derived streams of a single thread global number sequence generated at the generator at a controlled frequency of number generation, and wherein the global number sequence is partitioned into derived streams for each remote participating cluster; and using valid values in the outbound queue for ordering events at the cluster and as a global sequence number to provide an ordered value across remote participating clusters, wherein valid values are values where all corresponding values of a set have been received at other remote participating clusters.

According to another aspect of the present invention there is provided a system for generation of unique ordering of events at cloud scale, comprising: a generator including a processor and a memory configured to provide computer program instructions to the processor to execute the function of the following components: a single thread generator for generating a single thread global number sequence at a generator at a controlled frequency of number generation; a partitioning component for partitioning the global number sequence into multiple partitions with one partition for each remote participating cluster and each partition having a derived stream with an ordered corresponding value provided in each stream of a set of corresponding values; each partition including: a transmitting component for transmitting ordered corresponding values of a set from an outbound queue of each partition to a receiver at each partition's remote participating cluster and a receiving component for receiving the ordered corresponding values at an inbound queue of each partition; a return determining component for determining that all the ordered corresponding values of a set are received back in order to result in valid ordered corresponding values; and using valid ordered corresponding values as global sequence numbers to provide a distributed clock across the remote participating clusters, wherein a valid ordered corresponding value is a member of a set of corresponding values that have all been received at their respective receivers.

According to a further aspect of the present invention there is provided a system for generation of unique ordering of events at cloud scale, comprising: a receiver at a remote participating cluster, the receiver including a processor and a memory configured to provide computer program instructions to the processor to execute the function of the following components: a receiving component for receiving one of a set of ordered corresponding values at an inbound queue at the receiver from a remote sequence generator; a value placing component for placing the value on an outbound queue for return to the generator; wherein the set of ordered corresponding values are from derived streams of a single thread global number sequence generated at the generator at a controlled frequency of number generation, and wherein the global number sequence is partitioned into derived streams for each remote participating cluster; and using valid values in the outbound queue for ordering events at the cluster and as a global sequence number to provide an ordered value across remote participating clusters, wherein valid values are values where all corresponding values of a set have been received at other remote participating clusters.

According to a further aspect of the present invention there is provided a computer program product for generation of unique ordering of events at cloud scale, the computer program product comprising a computer readable storage medium having program instructions embodied therewith, the program instructions executable by a processor at a generator to cause the processor to: generate a single thread global number sequence at a generator at a controlled frequency of number generation; partition the global number sequence into multiple partitions with one partition for each remote participating cluster and each partition having a derived stream with an ordered corresponding value provided in each stream of a set of corresponding values; transmit ordered corresponding values of a set from an outbound queue of each partition to a receiver at each partition's remote participating cluster and receiving the ordered corresponding values at an inbound queue of each partition; determine that all the ordered corresponding values of a set are received back in order to result in valid ordered corresponding values; and use valid ordered corresponding values as global sequence numbers to provide a distributed clock across the remote participating clusters, wherein a valid ordered corresponding value is a member of a set of corresponding values that have all been received at their respective receivers.

According to a further aspect of the present invention there is provided a computer program product for generation of unique ordering of events at cloud scale, the computer program product comprising a computer readable storage medium having program instructions embodied therewith, the program instructions executable by a processor at a receiver to cause the processor to: receive one of a set of ordered corresponding values at an inbound queue at the receiver from a remote sequence generator; place the value on an outbound queue for return to the generator; wherein the set of ordered corresponding values are from derived streams of a single thread global number sequence generated at the generator at a controlled frequency of number generation, and wherein the global number sequence is partitioned into derived streams for each remote participating cluster; and use valid values in the outbound queue for ordering events at the cluster and as a global sequence number to provide an ordered value across remote participating clusters, wherein valid values are values where all corresponding values of a set have been received at other remote participating clusters.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Figure 1:
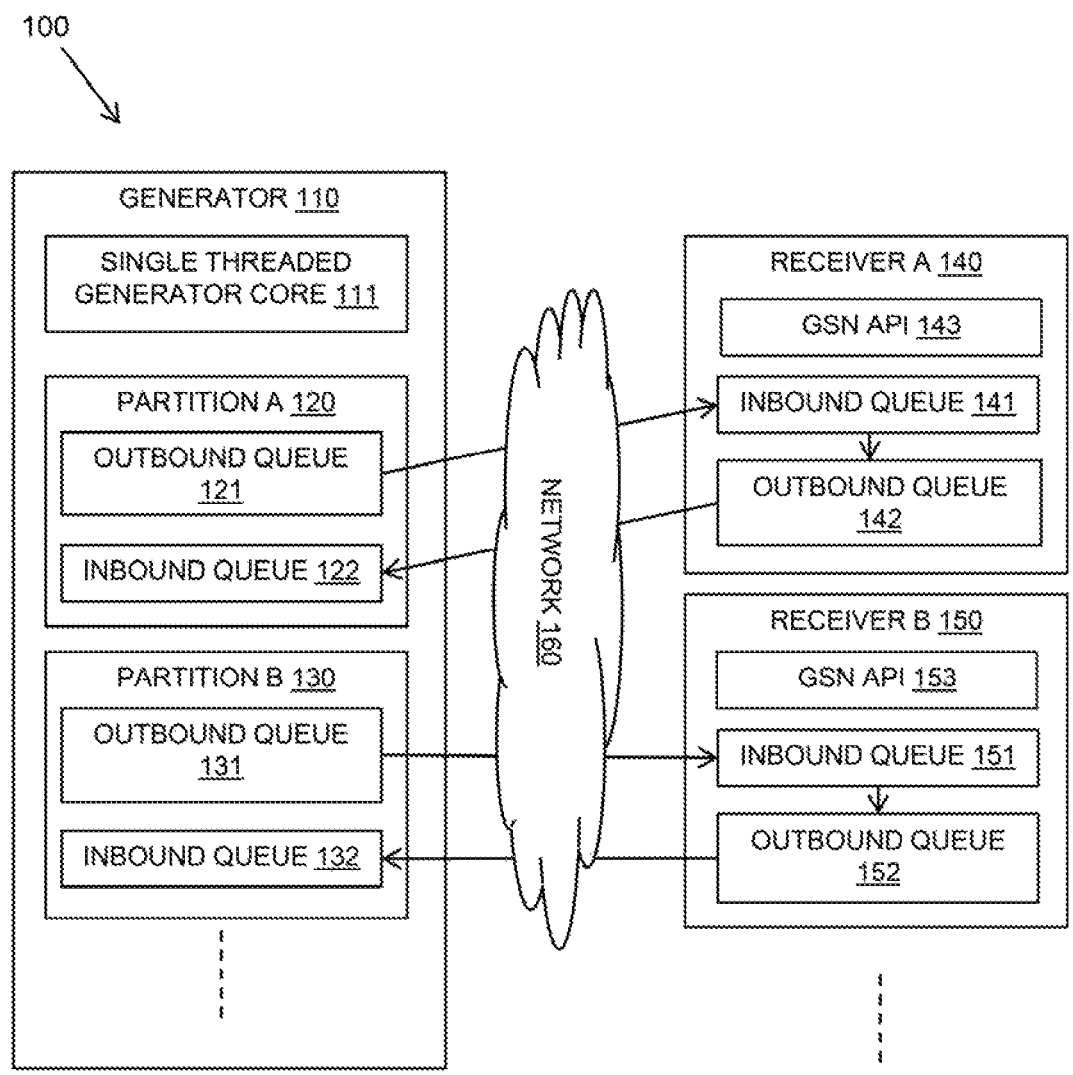
FIG. 1 is schematic diagram of a network system providing a distributed clock in accordance with an aspect of the present invention.

The described method and system provide a centralized generator of a sequence of numbers referred to as Global Sequence Numbers (GSNs). Referring to FIG. 1, a schematic diagram illustrates the described system 100.

A generator 110 is provided with a single threaded generator core 111 for generating a single thread global number sequence at a controlled frequency of number generation. The generator can be implemented in hardware or it can be implemented as software running on dedicated hardware.

The global number sequence space is partitioned into multiple partitions, illustrated as partition A 120, partition B 130, with one partition for each remote participating cluster in the system 100. Each cluster may be a cluster or single database servers.

Each partition 120, 130 has a derived stream from the global number sequence with a corresponding value of a corresponding value set provided in each stream. Such a scheme guarantees that within a derived stream, use of subsequent values are ordered. Any method that partitions the sequence into unique streams of numbers may be used. In one embodiment, if there are N receivers the sequence is partitioned N-ways using the modulo operator.

The derived streams have "corresponding values" across the streams forming a corresponding value set, which are values generated in a single round or turn for the partitions.

Each remote participating cluster has a receiver, receiver A 140, receiver B 150, and a framework provided across the network of the generator 110 and receivers 140, 150 is "the clock". This provides methods whereby events are ordered across the framework taking into account the latency for widely geographically distributed clusters. For all conflict resolutions, the GSN ordering is used in preference to any other ordering available such as timestamps, etc.

The receiver is a remote machine and may be either a general-purpose machine with specialized software or specially-constructed hardware. A unique thread bound to each queue can write the sequence into an array in the memory of the remote machine using a reliable order preserving two-way communication protocol such as Remote Direct Memory Access (RDMA) or Transmission Control Protocol/Internet Protocol (TCP/IP).

The generator 110 has the ability to define a specified number of receivers 140, 150 that will form the part of the generator/receiver framework that forms the distributed clock. The number of partitions 120, 130 is then provided for the number of receivers 140, 150.

Each partition 120, 130 of the generator 110 has an outbound queue 121, 131 and an inbound queue 122, 132. Each receiver 140, 150 has an inbound queue 141, 151 and an outbound queue 142, 152. Each partition outbound queue 121, 131 receives corresponding values of each respective partition's derived stream of the global number sequence. Each partition 120, 130 is closely tied to a receiver 140, 150 and the partition outbound queue 121, 131 sends the corresponding values to an inbound queue 141, 151 at the receivers 140, 150. The receivers 140, 150 put the received values on their outbound queues 151, 152 and transmit them back to inbound queues 122, 132 at the partitions 120, 130. This provides a measure of the round-trip latency of the receivers 140, 150 at the clusters.

In one embodiment, the order of transmitting corresponding values from the outbound queues 121, 131 of the partitions is configured in dependence on the lag of transmission time to the receivers.

The generator may wait for all the corresponding values of a set in all inbound queues to be received before a next set of corresponding values is transmitted by the partitions or may continue sending sets of corresponding values with a deadline to ensure all corresponding values are received back. If next sets of corresponding values are transmitted before all the previous set of corresponding values are received back, the receivers are notified of a queue length needed at the receiver to determine valid values for use as global sequence numbers.

Each receiver 140, 150 may have a GSN application programming interface (API) 143, 153 for providing global sequence numbers to applications in the cluster. Valid ordered corresponding values in the receiver queue provide the global sequence numbers to provide a distributed clock across the remote participating clusters. A valid ordered corresponding value is a member of a set of corresponding values that have all been received at their respective receivers.

The GSN APIs 143, 153 need to skip by design one or more value to obtain a valid corresponding value that can be used as a global sequence number. This can be increased to improve the overall performance by adding dedicated reader and writer threads and buffers and can be implemented in hardware for performance gains. In one embodiment, the generator may inform each receiver of the number of values to skip for a global sequence number based on the relative time lags of the transmission to the receivers.

The provided distributed clock has a global discrete time unit of the time period in which the generator receives the corresponding values from all the remote participating clusters, with each discrete time unit separated by a pause to accommodate the latency of the remote clusters.

Figure 2A:
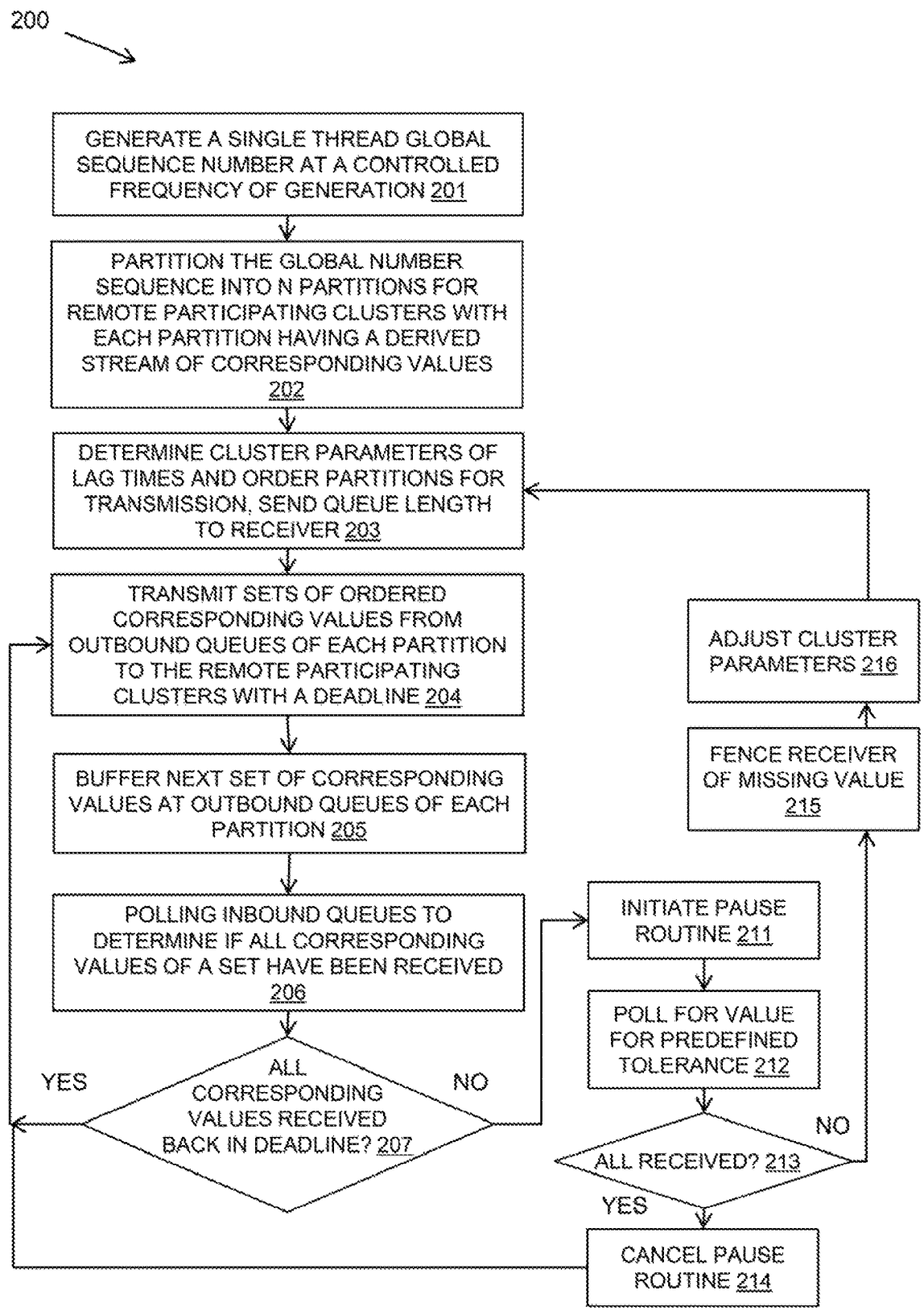
FIG. 2A is a flow diagram of an example embodiment of a method at a generator in accordance with an aspect of the present invention.

Referring to FIG. 2A, a flow diagram 200 shows an example embodiment of the described method for generation of unique ordering of events at cloud scale as carried out at the generator 110 of FIG. 1.

At step 201, the method generates a single thread global number sequence at the generator 110 at a controlled frequency of number generation and at step 202 partitions the global number sequence into multiple partitions with one partition for each remote participating cluster. Each partition has a derived stream with corresponding values provided in each stream.

In one embodiment, at step 203 the method may determine cluster parameters including the lag times of receivers and may order the partitions for transmission based on the cluster parameters. The method may send a receiver queue length for valid global sequence numbers to each receiver. This step is described further in FIG. 3C.

At step 204 the method transmits the ordered corresponding values from an outbound queue of each partition to a receiver at each partition's remote participating cluster. At step 205, a next set of corresponding values may be buffered in the outbound queues of the partitions.

In one embodiment, at step 204 the method may continue to transmit next sets of corresponding values, but each set of corresponding values has a deadline by which the values must be received back, otherwise the method must pause and resume as described further below. In which case the deadline is the starting signal of the next corresponding set. In another embodiment, at step 204 the method only transmits a next set of corresponding values when a previous set has been received back at the generator.

At step 206, the method may poll the inbound queues of the partitions to determine 207 if all the corresponding values have been received back within the predefined deadline. If the corresponding values are all received back in the deadline, at step 204 the method continues transmitting sets of corresponding values.

However, if all the corresponding values of a set are not received back in the deadline, a pause and resume routine is carried out. At step 211, the method may initiate a pause routine and at step 212 poll for the outstanding value(s) for a predefined tolerance. A t step 213 It may be determined if all the values are received in the tolerance. If they are received, at step 214 the pause routine may be cancelled and at step 204 the transmission of sets of corresponding values continued. If the outstanding values are still not received, at step 215 the method may fence a receiver of a missing value and at step 216 adjust the cluster parameters accordingly and continue the method with the adjusted cluster parameters at step 203.

Figure 2B:
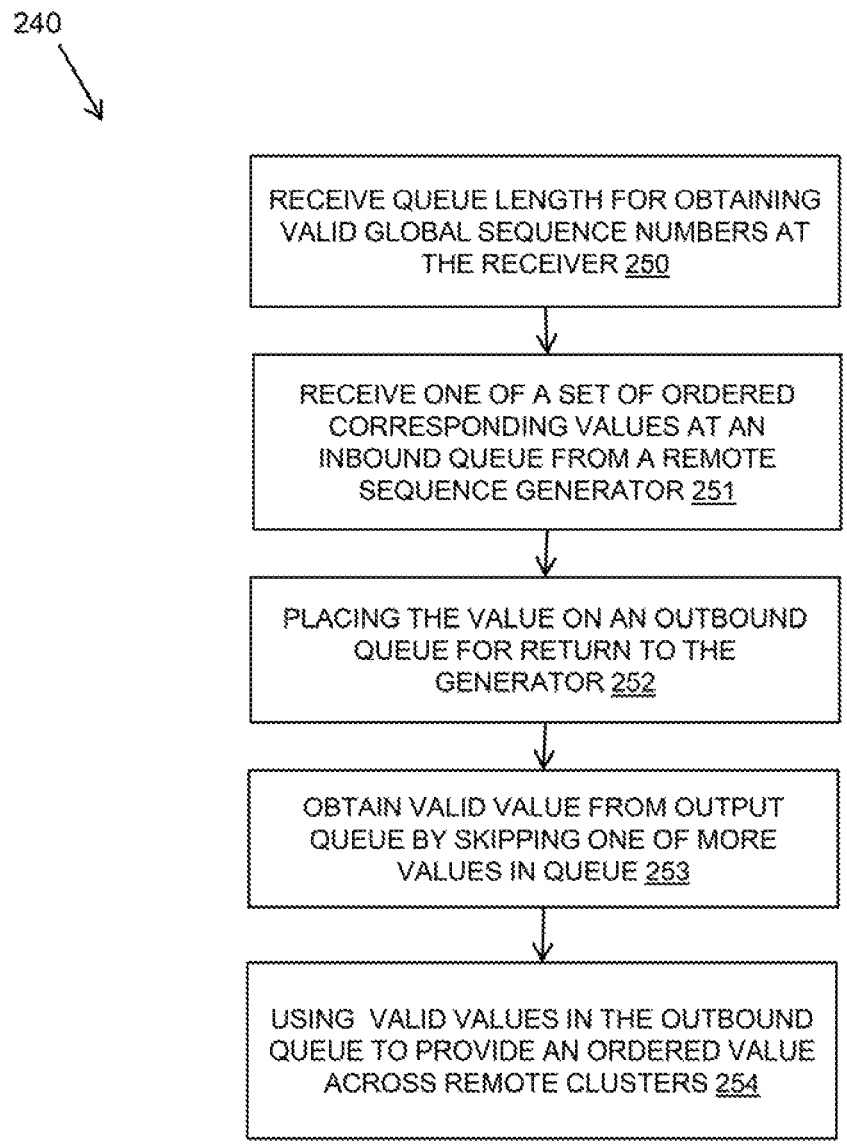
FIG. 2B is a flow diagram of an example embodiment of a method at a receiver in accordance with an aspect of the present invention.

Referring to FIG. 2B, a flow diagram 240 shows an example embodiment of the described method for operation of a receiver 140, 150 of a remote participating cluster for generation of unique ordering of events at cloud.

Optionally according to one embodiment, at step 250 the receiver may receive a queue length for obtaining valid global sequence numbers at the receiver.

At step 251, the method at a receiver may receive one of a set of ordered corresponding values at an inbound queue from a remote sequence generator and at step 252 may place the value on an outbound queue for return the generator.

At step 253, the method may obtain a value from the outbound queue that is a valid ordered corresponding value that can be used as a global sequence number to provide a distributed clock across the remote participating clusters. A valid ordered corresponding value is a member of a set of corresponding values that have all been received at their respective receivers. This may be obtained by skipping at least one value in the outbound queue. In an embodiment in which the queue length is received at the receiver at step 250, the queue length is used to determine the number of values to skip in the outbound queue to obtain a valid value.

At step 254, the method may use the valid values in the outbound queue for ordering events at the cluster and to provide an ordered value across multiple remote participating clusters.

An example embodiment of the generation of the GSN is described in more detail below.

A sequence is a set of ordered natural numbers such that between two successive elements the difference is one. The sequence generator always generates an element in a unit of time that is controlled by a clock, which can be a configurable value. The output of the generator is a sequence of natural numbers. 1, 2, 3, 4, . . . , $N_i$, where $N_i$ is the $i^{th}$ value of the sequence.

Although mathematically the sequence does not have an upper bound, actual implementation would be constrained by the fact that computer registers have a finite maximum value they can accommodate; however, for practical purposes this can be ignored. For example, if there is a 64-bit registry holding sequence values, this can accommodate $2^{64}$ distinct values, which roughly can operate without interruptions for approximately 580 trillion years if values are generated at the rate of one value a second. Even if we increase the rate of generation to one micro-second we can operate the cluster without interruption for roughly half a million years.

Once the number of participating clusters and therefore receivers and partitions is defined, the generator has N number of streams derived from the single sequence each partitioned based on their N modulo operator value.

For example, in the case where there are two receivers, each sequence value is partitioned by modulo 2 value. The possible modulo 2 values are 0 and 1 and the sequence then can be split into:

2, 4, 6, . . . , 2N
1, 3, 5, . . . , 2(N−1)

In the case where there are three receivers, the stream would be partitioned by modulo 3. The possible modulo 3 values are 0, 1 and 2 and the sequence will then be split into:

3, 6, 9, . . . , 3N
2, 5, 8, . . . , 3(N−1)
1, 4, 7, . . . , 3(N−2)

Each stream is distinct by itself and still time ordered because the values are taken from the single generator sequence and they appear in the sequence each following the previous value by a defined interval, which is the frequency of the clock. This is the regular periodic frequency with which the single thread generates the values.

The generator has, based on the configuration value N, N sets of outbound and inbound queues. There is a single thread that splits the single generated sequence and populates each of the outbound queues. Each of the outbound queues is tightly associated with a single receiver.

The sequence values in the outbound queues are transmitted to the corresponding receiver's inbound queue. The specific mechanism of transmission is not relevant; however, there is a finite delay for the signal to travel to the remote site where receiver is located.

The receivers likewise have an inbound and an outbound queue. A thread polls on values that comes in the inbound queue and places them in the outbound queue. The values in the outbound queue are shipped back to the generator.

For example, if P is a partition of the GSN space:

$$P=\{gsn1, gsn1+i, gsn1+2i, \ldots, gsn1+ni\}$$

For any x it is guaranteed that gsn1+(x+1)i is later than gsn1+xi.

It is also guaranteed that for a receiver located at a certain signaling distance (expressed in seconds) gsn1+(x+1)i will be received later than gsn1+x i. If the receiving cluster is constrained to receive sequences in order, and further constrained to use a log flush only in conjunction with a GSN number, the paired log flush events are also guaranteed to be ordered.

Likewise, if there are two partitions of GSN, P1 and P2, used by cluster C1 and C2 respectively and if the $i^{th}$ GSN of one partition is greater than the other, the smallest of the GSN value is guaranteed to be generated earlier than the larger value. If additional constraints are imposed on the usage of the GSN value, ordering can be guaranteed of log flushes of two geographically distributed clusters.

The described system provides a unique generator of GSNs at a certain frequency. The frequency may be a configurable value and may depend on such factors as the precision of a clock available on hardware. A second configurable may be the number of different ways the sequence could be partitioned.

Based on the hardware clock in the system, the system keeps generating a sequence and partitions them and writes each partitioned GSN set into a separate queue.

The above guarantees that each value received on a single cluster (say C1) is time ordered. i.e. if a reader thread takes a value $GSN_{c1}, GSN_{c2}, \ldots, GSN_{cn}$ etc. to order log flush events in a local cluster, each value is guaranteed to be smaller than its predecessor.

It is also guaranteed that a value received on a separate cluster (say C2) is guaranteed to be greater than the corresponding value on C1 (by design) and by extension if corresponding values are considered, each cluster is staggered to take a later generated number and hence by design within the discrete time quanta, the GSN received by each cluster is again ordered. Out of order entries are tackled by the fact that the receivers needs to receive the set of corresponding values.

In a described embodiment, the generator waits for all corresponding values in a set to complete the round trip to their respective receivers until a deadline. This deadline is a property of the cluster and can be determined as described below by a calibration routine to determine cluster parameters.

In a simplification of this embodiment, the deadline can be set to 1 in which case the generator will have to wait for the corresponding signals to return before sending the next one. The number of values each receiver will need to skip can accordingly be computed and communicated at the start of the operation as described by the calibration process. The calibration process can be invoked to adapt the cluster at any point. For example, when a data center moves or when a better network infrastructure requires recalibration. In the simplest case, the receiver needs to skip the latest value in the inbound queue to obtain a valid value to use as a global sequence value, with no additional communication needed to the receivers. This can be abstracted into the GSN API it provides to consumers of the receiver.

From the perspective at a receiver, a receiver will only receive ordered set of values. For example, in a scenario with three receivers in the distributed clock, each one will receive a partitioned set. Receiver 1 will receive a partition set which will yield 0 upon Modulo 3 operation. So, it will see values 0, 3, 6, 9 . . . in its inbound queue, which are guaranteed ordered. By design, 0 will be received before 3, which will be received before 6, and so on. It also puts the values back in its outbound queue in order, so 0 will be put in the outbound queue before 3, which will be put in the outbound queue before 6, and so forth.

Valid values may be obtained from a receiver's queue as described in the following two paragraphs.

The last N values received will be ambiguous because it is not guaranteed that other receivers in the distributed clock would have received a corresponding value. If there are only N values in the outbound queue, the value cannot be used to order an event in some global sequence as it does not know if other clusters have received their corresponding value.

Skipping the last N values received and picking the N+1 oldest value would not be ambiguous and would therefore be a valid value because the constraint cannot be met unless all corresponding values come back to the generator within a deadline failing which the generator will "pause" the operation of the cluster. Since the receiver has seen the last N values, its $N+1^{th}$ value belongs to an ordered set which all receivers in the cluster have seen. Therefore, if there is a minimum of two values in the outbound queue, the last value is skipped, and the second latest value is used when the deadline is 1.

The receiver therefore skips a predefined number of values and is thereby guaranteed that the oldest value is ordered.

From the perspective at the generator, a single thread generates the sequence with a finite adjustable frequency. This means that given two sequence numbers a and b such that a>b then it is guaranteed that b was generated earlier than a. A single thread splits the sequence into outbound queues. This guarantees that the outbound queue is populated in the same order in which it was generated.

There is no guarantee in the order in which the corresponding value will be received, but they will all be received before the next set of values is sent out. This means that there is a need to buffer values from the single generator thread in the outbound queues for the generator. There is also a mechanism provided to put backpressure on the generator queue to slow down the generation to essentially operate the cluster at the frequency of the slowest member can be devised.

A calibration routine is carried out at startup and signals are sent to obtain an average of the round-trip delays for the participating clusters. The receivers at the clusters are then ordered and how much lag between receivers is calculated. A queue length for each receiver is calculated based on the receiver lag time to determined how many values must be in the queue at the receiver before the receiver can use the values as valid values for global events.

The receiver will then ensure a sufficient number of values are skipped in the queue before it uses them as valid global sequence numbers. If there are insufficient received values, the receiver must wait until more values are received. This reduces the wait for valid values to the largest lag between receivers.

The algorithm of the method restricts the rate at which the generator sends out a sequence number to one corresponding value set a time, where a corresponding value set is defined as:

$$\{s | s \varepsilon P_i \text{ where } P_i = \{x_j + i \text{ where } i \text{ is the modulo operator value corresponding to each Partition}\}\}$$

As a certain signaling distance between each receiver and the generator can be envisioned, a routine may be devised to determine the signaling distance at any given time. This time may be, for example, at start, when a new receiver joins the cluster, or when a temporary signaling delay requires recalibration.

When this routine is invoked, the generator sends a sequence as usual to the output queue to each receiver using the same partitioning technique as detailed above. When a signal is received from each receiver, by measuring the delay between when the signal was sent out and when the signal was received the generator can work out the signaling distance between each receiver and itself.

When all the signals are received, the generator may order the receivers according to the relative distance between each receiver and the slowest receiver. This quantity can be defined as the lag, the relative distance between receivers.

Figure 3A:
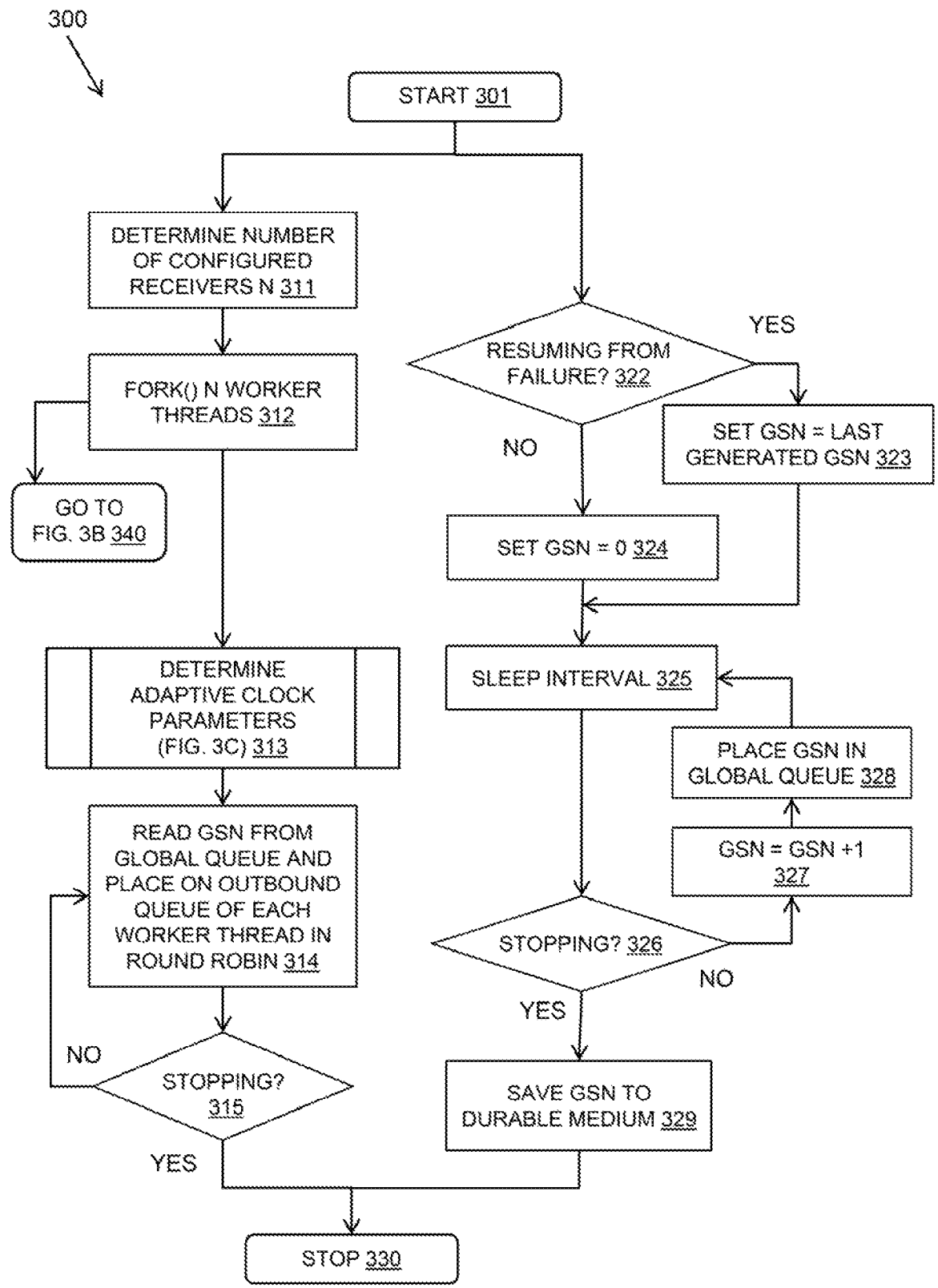
FIGS. 3A, 3B and 3C are flow diagrams of example embodiments of aspects of the method at a generator in accordance with an aspect of the present invention.
Figure 3B:
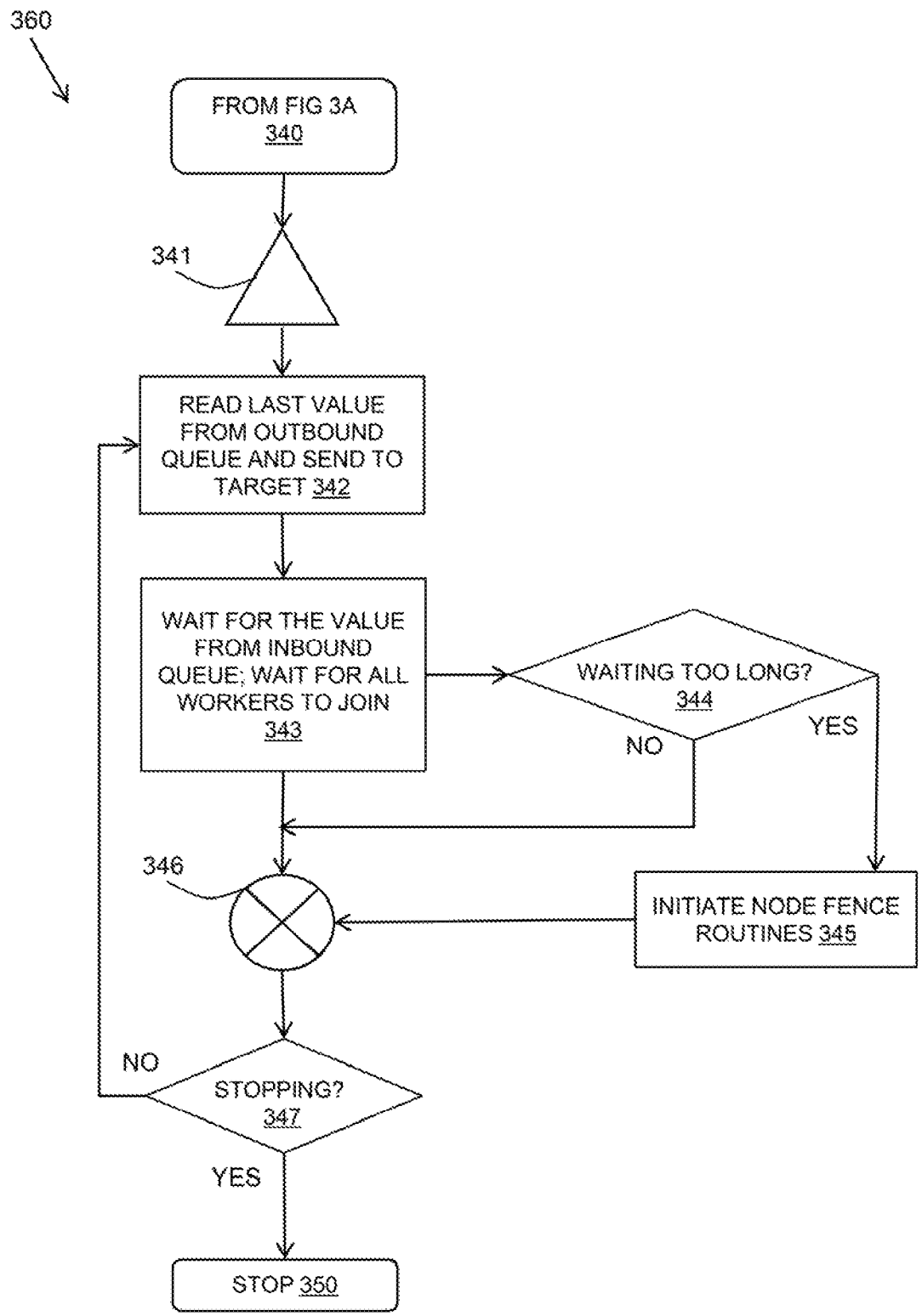
Figure 3C:
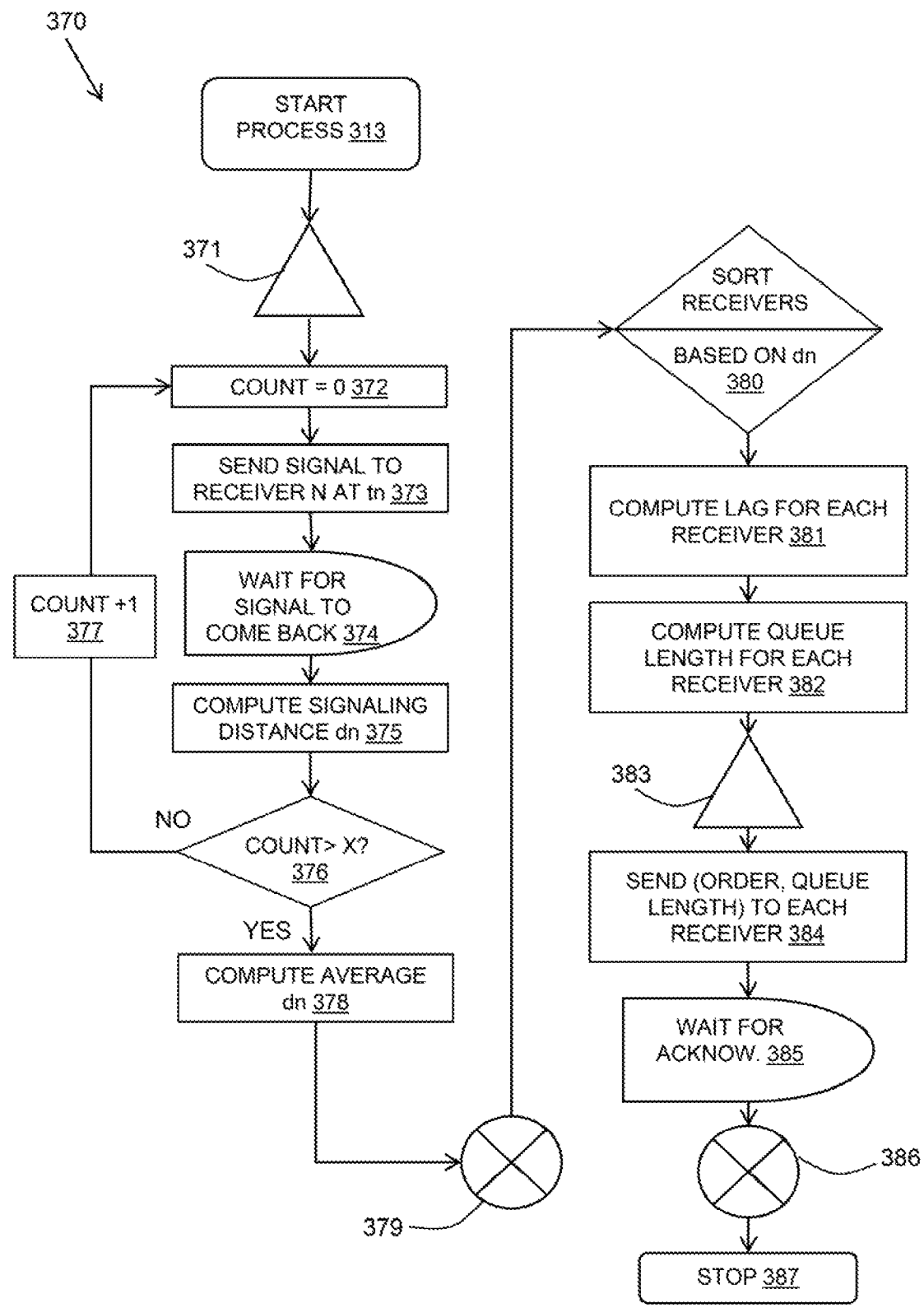

Once the lag is known for each receiver, a queue length for each receiver can be worked out, for example, according to the method described in relation to FIG. 3C.

The method introduces the possibility of multiple outstanding values dispatched from a generator to a receiver, therefore a reliable communication channel is required from the generator to the receivers, such as TCP/IP or IPoIB (Internet Protocol over Infiniband). This may alternatively, be implemented on a second communication channel between the generator and the receivers.

From the perspective of a consumer of the GSN at a receiver, it will receive a continuous stream of numbers with a finite gap. For example, 0, 2, 4, 6, 8, . . . , 2N for a 2-way distributed clock.

Independent of the clock there are actual events that happen in the systems that consumes the GSN. These events may be labeled:

$$ev1, ev2, ev3, \ldots, evn$$

These events can be categorized into two kinds. One for which local ordering is sufficient and another which needs to be ordered among events from another system that will consume the GSN sequence numbers at another location.

Events may be called evl1, evl2, evl3 . . . , evlN to signify the locally ordered events and evg1, evg2, evg3, . . . , evg4 to signify the events that needs global ordering.

They can be interleaved which actually amounts to mapping ev1, ev2, ev3, . . . , evn to a combination and permutation of evli and evgi. For example, evl1, evl2, evl3, evgl4, . . . .

So, a combination of locally generated unique number and a globally generated number can provide unique ordering for events.

For example, two numbers: the GSN (Global Sequence Number), and the LSN (Local Sequence Number) can uniquely order events.

(1,1), (1,2), (1,3) . . . (2,p), (2,p+1), (2,p+2) . . . (g,1), (g,1+1), . . . .

Referring to FIGS. 3A, 3B and 3C, flow diagrams 300, 360, 370 show further details of an example embodiment of a method carried out at the generator.

In FIG. 3A, the method starts at step 301 and a number n of configured receivers is determined, at step 311, and the process forks at step 312, fork( ), n worker threads. This initiation process for receivers is shown in FIG. 3B 340.

The method may optionally provide a process at step 313 to determine adaptive clock parameters to provide ordering and queue lengths to the receivers according to the second embodiment described above. This process at step 313 is described in detail in FIG. 3C.

GSNs are read at step 314 from a global queue of GSNs and placed on the outbound queues of each worker thread in a round robin. This process continues until it is determined at step 315 that the process is stopping and then the method may stop at step 330.

In parallel with the above process, it may be determined at step 322 if the generator is resuming from failure. If so, the GSN may be set at step 323 as the last generated GSN. If not, the GSN is set at step 324 to zero.

There may be a sleep interval 325 and it may be determined at step 326 if the process is stopping. If it is not stopping, the GSN may be incremented at step 327 to GSN+1 and the GSN placed at step 328 in the global queue. If it is stopping, the GSN may be saved at step 329 to a durable medium and the process may stop at step 330.

Referring to FIG. 3B continued from FIG. 3A at step 340 a receiver initiation method is described. The process may branch at step 341 into multiple independent threads doing similar but independent actions. The method threads may read at step 342 a last value from an outbound queue and send it to its target. The method may wait at step 343 for the value from the inbound queue and wait for all workers to join. It may be determined at step 344 is the wait for all receivers is too long. If so, the method may initiate at step 345 node fence routines.

The branches of threads may be joined at step 346 and the flow may proceed in a single threaded fashion and may determine at step 347 if it is stopping and, if not, it may loop to read a last value from outbound queues at step 342. Otherwise, it may stop at step 350.

Referring to FIG. 3C, the process at step 313 may start and may fork at step 371 to multiple threads for each receiver.

For each thread, a count may be started at zero at step 372 and a signal at step 373 may be sent to receiver n at time $t_n$. Let G be the generator and $\{R_1, R_2, \ldots, R_n\}$ be the set of receivers and let signals be dispatched to each one of the receivers per the standard algorithm at $\{t_0, t_1, \ldots, t_{n-1}\}$ to the corresponding receivers $\{R_1, R_2, \ldots, R_n\}$ respectively.

The process may wait 374 for the signal to come back and the signaling distance $d_n$ may be computed. Let the signal be received back at the generator at times $\{t'_0, t'_1, \ldots, t'_{n-1}\}$ and then the signaling distance between each of the receivers and the generator is: $(t'_0-t_0)/2, (t'_1-t_1)/2, \ldots, (t'_n-t_n)/2$ (division by 2 because of the round trip).

It is determined if the count has reached a threshold X suitable for averaging. If not, the count is incremented at step 377 and the process repeated until the threshold count is reached. The signaling distances $d_n$ are averaged at step 378 and the threads for the receivers may join at step 379. The method may sort at step 380 the receivers based on $d_n$.

A simple permutation is carried out to allow the further calculations to be kept simple: $\{R_1, R_2, \ldots, R_n\} => \{R^{new}_1, R^{new}_2, \ldots, R^{new}_n\}$.

At this point all the receivers are ordered by the signaling distance d, where d can be expressed in units of the frequency of the sequence generator, to give a new set: $\{R_1, R_2, \ldots, R_n\}$ and a corresponding set of signaling distance $\{d_1, d_2, \ldots, d_n\}$, wherein $d_1$ is the smallest distance.

The method may compute at step 381 the lag for each receiver. The lag=$\{d_1-d_1, d_2-d_1+1, d_3-d_1+2, \ldots, d_n-d_1+(n-1)\}$. The extra term deliberately lags each receiver by one when arranging them into a set. As each signal is generated a clock tick after the previous signal, as it moves through the order, they all go a clock tick further. So lag becomes: $\{0, d_2-d_1+1, d_3-d_1+2, \ldots, d_n-d_1+(n-1)\}$.

The method may compute at step 382 a queue length for each receiver.

For each of the receivers, the number of signals dispatched between a given signal leaving the generator and when the signal comes back can be found as below:

Outstanding Signals=$\{\text{Floor}(d_1 \times 2)/n, \{\text{Floor}(d_2 \times 2)/n, \ldots, \{\text{Floor}(d_n \times 2)/n\}$.

The number of signals in the queue of each receiver when a corresponding signal is sent and received can be determined as:

Number of signals in queue=$\{1+\text{Floor}((d_1 \times 2-n)/d_1), 1+\text{Floor}((d_2 \times 2-n)/d_2), \ldots, 1+\text{Floor}((d_1 \times 2-n)/d_n)\}$, where floor takes as input a real number and gives as output the greatest integer less than or equal to the input.

The receiver threads of the method may fork 383 and the method may send 384 to each receiver the queue length to be maintained as:

$\{1+\text{Floor}((d_1 \times 2-n)/d_1), 1+\text{Floor}((d_2 \times 2-n)/d_2), \ldots, 1+\text{Floor}((d_1 \times 2-n)/d_n)\}$ The method may also send the order to each receiver, as the order allows the receiver to have some form of self-awareness. A particular case when this might be useful is when the generator dies, and a new generator is elected to take his place, the entire distance needs to be recomputed and a new order set. So, under that setup there might be a situation where the receiver needs to skip a whole range of values in his queue and pick a new set and the order helps the receiver to ensure the correctness of the value it receives.

The method may wait at step 386 for acknowledgement from all the receivers and may join at step 386 the threads and stop at step 387 the process.

The method continues as described in FIG. 3A the cluster algorithm as described may be initiated. Using the time lag of receivers, an API to take a value from the queue on each receiver needs to make sure it has the queue length number of values in the queue before it can take the oldest value.

This embodiment of providing a queue length for each receiver to accommodate relative receiver lag introduces additional operating constraints. A corresponding set is a concept that is important at the sequence generator as this set of values need to be all received at the generator before any values generated after the deadline are sent out. Otherwise the sequence of events at the receivers is not guaranteed ordered. In this embodiment, as the signal is sent to the receiver with the shortest distance first, corresponding values are sent to the other receivers during the round-trip latency of the shortest distance, together with the longest lag between it and the farthest receiver plus an additional interval which would be the deadline for receiving the corresponding set.

To compute the deadline, the set of lags computed in step 381 of FIG. 3C above is rephrased as: Lag=$\{0, d_2-d_1+1, d_3-d_1+2, \ldots, d_n-d_1+(n-1)\}$ Let that be written as: Lag=$\{0, l_1, l_2, \ldots, l_n\}$ and the total lag between the closest receiver and the farthest receiver is $l_n$.

So, for example, when receiver receives 0, $l_n$ intervals should elapse before the generator is sure that all the signals from other receivers are received.

Between the interval signal 0 is generated and the signal 0 is received from the receiver, the generator must wait $d_1$ which is the signaling distance to receiver 1.

So effectively, the generator may continuously generate and send signals 0 until $(d_1+l_n)$ within which time the generator should receive the corresponding set $\{0, 1, \ldots, n-1\}$. If n−1 is not received within this interval, $(d_1+l_n+1)$, further signals are not generated and sent. This may be defined as the "pause distance" and the cluster initiates a "global pause", until signal n−1 is received and resumes sending values when n−1 is received.

In other words, after the generator receives back the first of the corresponding set (in this example 0) it has to $l_n$, which is the lag between the closest receiver and the farthest receiver.

The method determines that all the ordered corresponding values have been received within a certain deadline determined by the number of intervals between the first signal of the corresponding set leaving the generator and the lag between the closest receiver to the generator and the farthest receiver to the generator.

If a set of the corresponding values is not received back within the generation of the signal defined by the round trip latency of the closest receiver and the longest lag, the generation and sending of the signals may be paused and resumed when all the corresponding values have been received or, if one is missing, a node fencing routine has been carried out and the cluster operating parameters adjusted accordingly.

Figure 4:
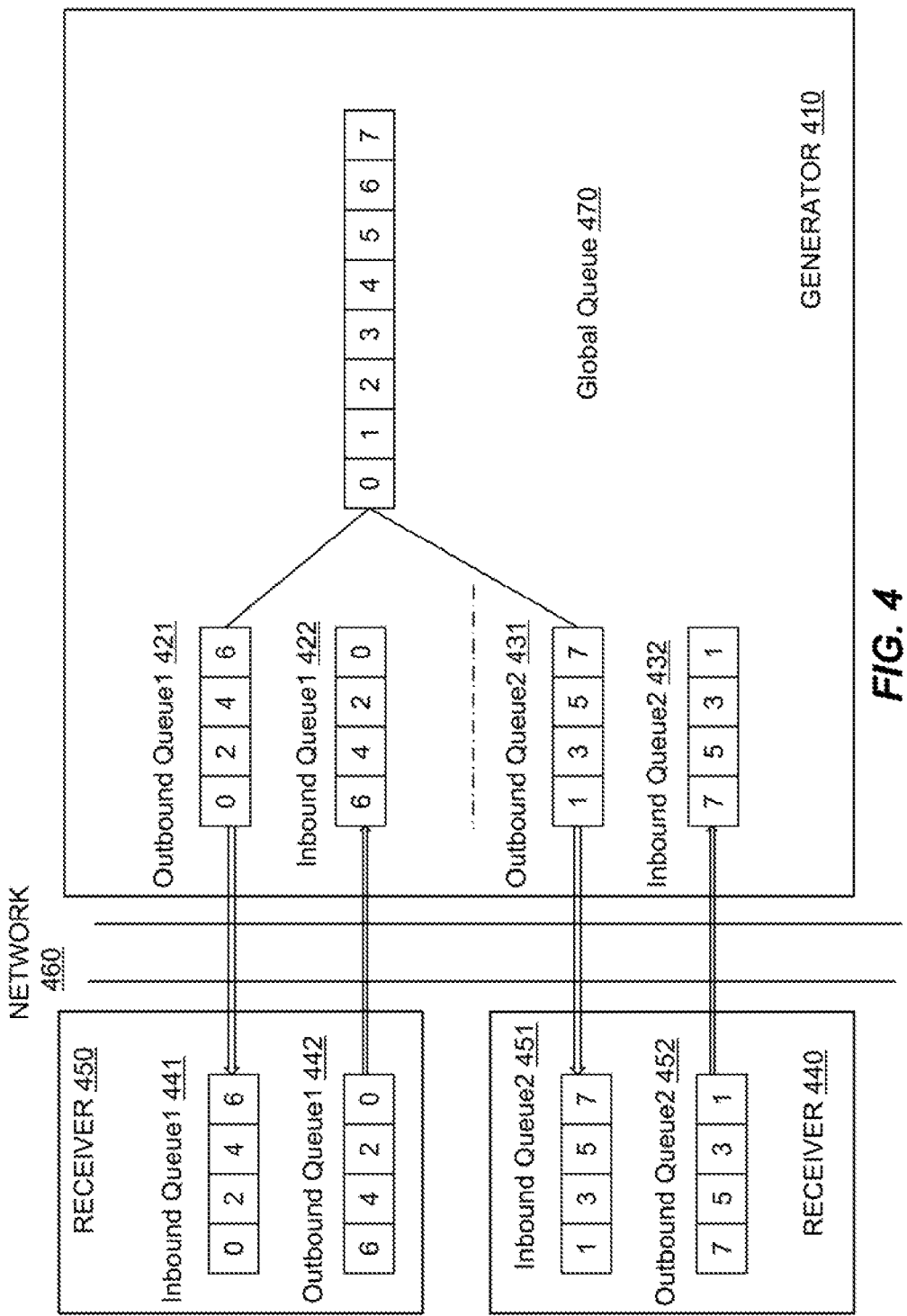
FIGS. 4 and 5 are schematic diagrams illustrating example embodiments of the described invention.
Figure 5:
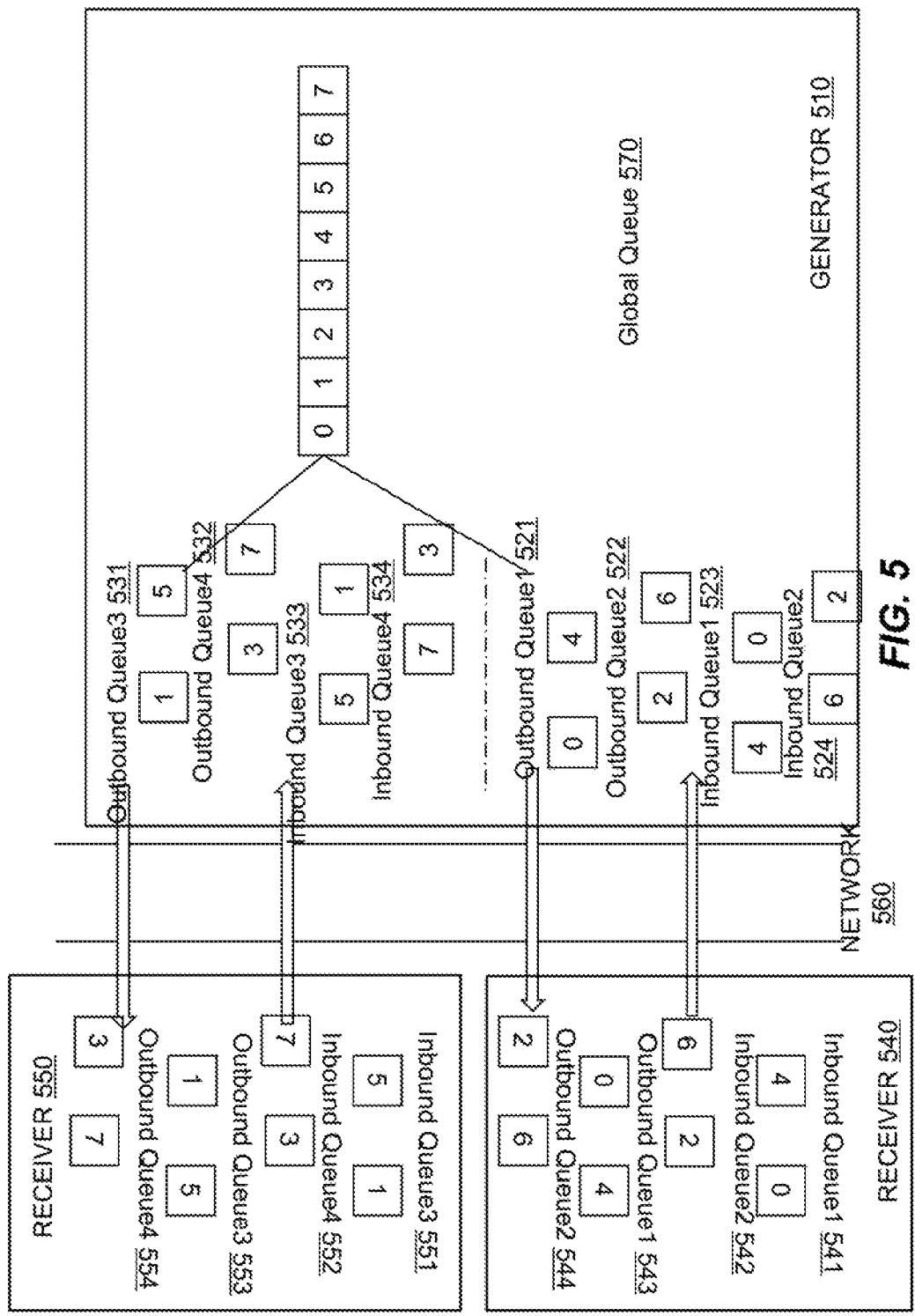

Referring to FIGS. 4 and 5, two example scenarios of the described method are illustrated.

FIG. 4 shows a first example scenario in which a generator 410 has a first partition tightly bound to a first receiver 440 and a second partition tightly bound to a second receiver 450. The receivers 440, 450 being at remote clusters. The first partition has outbound and inbound queues 421, 422 and the first receiver 440 has inbound and outbound queues 441, 442. The second partition has outbound and inbound queues 431, 432 and the second receiver 440 has inbound and outbound queues 451, 452.

In this example scenario, the global queue 470 has the global number sequence 0, 1, 2, 3, 4, 5, 6, 7 . . . . There are two partitions and the corresponding values 0, 1 are put on each of the partitions outbound queues 421, 431, followed by corresponding values 2, 3, then corresponding values 4, 5, and then corresponding values 6,7. The generator threads that write into the outbound queues wait for all previous corresponding values to be received before writing the next corresponding values to guarantee ordering.

Each of the partition outbound queues 412, 431 transmits the first corresponding values 0, 1 to the inbound queues 441, 451 at each of the receivers 440, 450. The receivers put the received values onto the outbound queues 442, 452 and send these back to the inbound queues 422, 432 of the partitions.

The mean round trip latencies tc1, tc2 are the time it takes for a value from the outbound queue 421, 431 to travel to the receiver and back to the inbound queue 422, 432 of each partition.

Assuming that receivers are at distance tc1 and tc2 where tc1>tc2. This makes the stopping distance 2×tc1+1. The round-trip latency between sending sets of corresponding values, a cluster may take a GSN value once every $\Delta \cdot t$, where $\Delta \cdot t$ is the frequency of GSN generation and tc1 and tc2 are the mean round trip latencies. The time $\Delta \cdot t$ between sequence values can be adaptively varied. A cluster second is the smallest time unit when the GSN receives corresponding values from all the participating clusters. At each cluster MAX(Queue1)>MAX(Queue2). When the cluster is operating continuously this tends to be on average $\Delta \cdot t$.

Example

There is a GSN round trip latency of 200 ms from C1 and 250 round trip latency from C2 and assume $\Delta t=50$ ms. The deadline for the corresponding set is 200+50+50=300 ms. The queue length becomes 2 and 1 respectively. After an initial delay of 350 ms the receivers can take one value every 50 ms.

Moreover, since it is possible to dial $\Delta t$ down, assuming it now operates at 10 ms, then it is possible to take a value in 10 ms.

FIG. 5 shows a second example scenario in which a generator 510 has a first partition tightly bound to a first receiver 540 and a second partition tightly bound to a second receiver 550. The receivers 540, 550 being at remote clusters. The first partition has two outbound queues 521, 522 and two inbound queues 523, 524 and the first receiver 540 has two inbound queues 541, 542 and two outbound queues 543, 544. The second partition has two outbound queues 531, 532 and two inbound queues 533, 534 and the second receiver 550 has two inbound queues 551, 552 and two outbound queues 553, 554.

A cluster in this embodiment may take a GSN once every 2 (2$\Delta \cdot$t+max(tc1,tc2)) from one of its input queues. This amounts to an overall delay of 2 $\Delta \cdot$t over the previous case but the cluster can take a value from the second queue 2 $\Delta \cdot$t after it picked a value from the first queue. Since $\Delta \cdot$t can be controlled, it can be dialed down allowing faster operation.

The receiver will receive a value once every cluster second. So, the receiver can, at best, order one event per cluster second. The splitting logic elongates the cluster second in proportion to a factor of the number of partitions and by another term which is itself proportional to the frequency with which the sequences are generated and the product of the number of partition and the number of input queues. By generating the numbers much faster this term can be kept quite small and the splitting allows the cluster to take m values all spread out equally by the frequency with which the number is generated in addition to the elongated cluster second.

The following potential concerns are addressed: Loss of the GSN generator and maintaining the sequence ordering upon restart; and Network Partitions where some members cannot access the GSN generator.

Loss of GSN Generator

Figure 6:
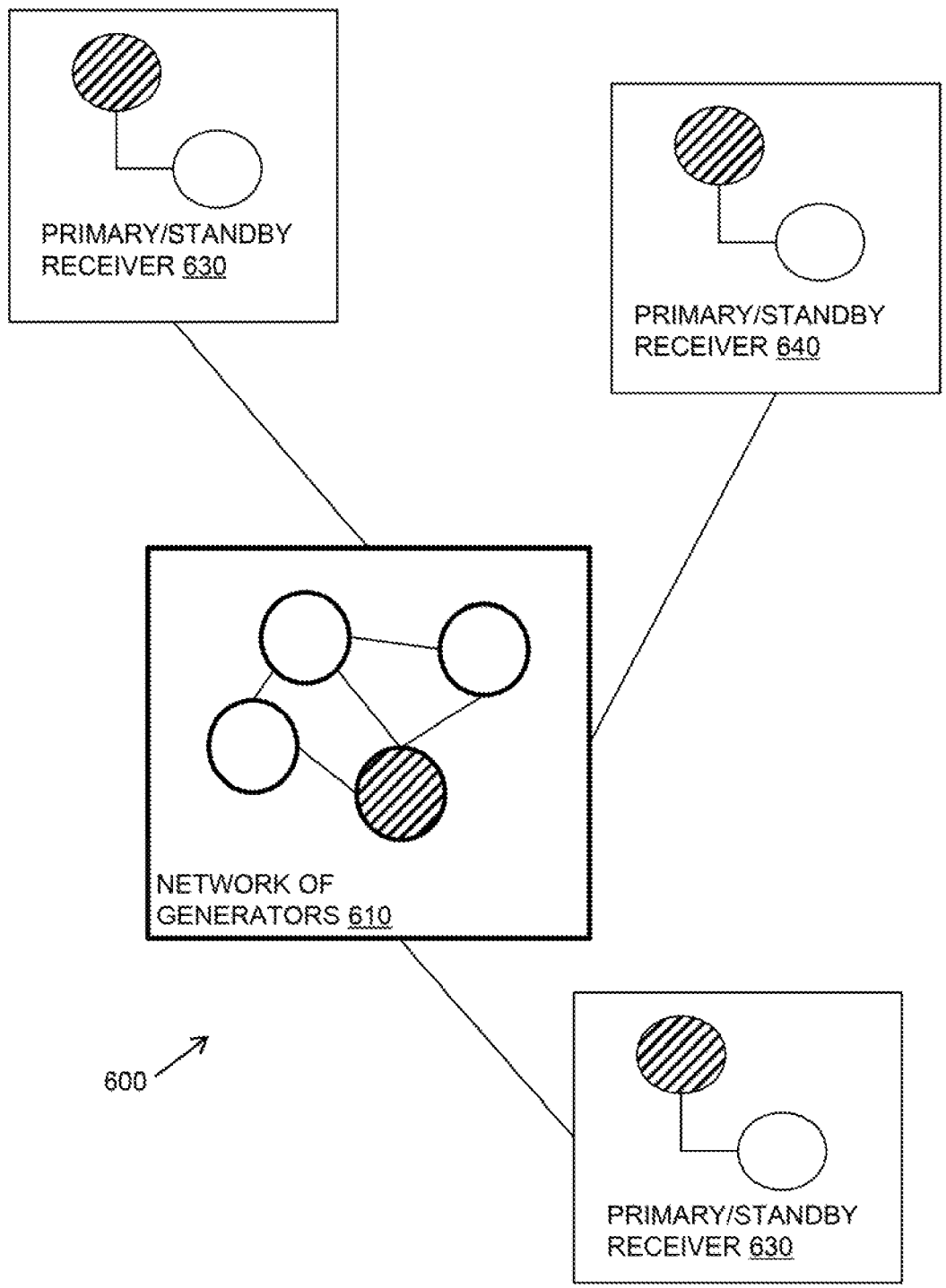
FIG. 6 is a schematic diagram of an example embodiment of a network system in accordance with an aspect of the described invention.

An approach to losing a single GSN generator is to envision a network in a Byzantine fault tolerant network. An example embodiment is illustrated in the system 600 of FIG. 6.

A Byzantine network of GSN generators 610 may be provided (including possibly having a few of them separated by 10 or 20 km) with a generator master. The system 600 may include primary and standby receivers 630 at each cluster.

In this approach, the max(GSN) is durable (preferably in a fast-durable microelectronics memory) and is accessible to all members in the standby generator cluster. In the event of failure, one of the members of the GSN generator cluster is voted as the next GSN generator.

Another approach is to bootstrap and reconstruct the max(GSN) generated from all the GSN receivers.

Network Partitions

Receivers who do not respond in pre-configured intervals of time can be fenced off from the network and allowed to join at a later time. If a member cluster fails to respond with the last dispatched results for a configured time interval, a probing routine can be initiated and the partitioned sequence for that member not be written out until the last GSN is received by the member cluster.

If a cluster does not return a value before a pre-configured interval, the member's queue is withheld, and the rest of the queues are filled in as before. The deadline needs to change only if the receiver with the largest lag or the receiver closest to the generator fails to respond. This ensures that a temporary glitch in the network will not allow the partitioned clusters to make progress. When an old value is returned, the GSN generator can resume generating GSN for the cluster.

From a cluster's perspective, if a network partition causes failure of receiving GSN, then the cluster can wait causing all ongoing transactions to wait.

Performance Designs.

In the above architecture, generating the sequence numbers and partitioning it can be done at CPU clock speeds. If there are 64-bit numbers, and the generator generates a sequence once every 100 microseconds, a GSN generator may operate for approximately 58 Million years.

The outbound queues for each participating cluster can also be populated at CPU speeds. However, the network operation might be blocking. This will reduce the overall performance of the cluster. This can be alleviated by having a dedicated thread on a dedicated core take one outbound request and write it into the wire. A second thread on a dedicated thread on a dedicated core can write the second outbound request after a finite delay (say 100 micro seconds) and so on. A dedicated thread on a dedicated core polls for the response and if, a finite network latency is assumed, should receive a request once per 100 micro seconds. This means that the receiving cluster has a unique, time-ordered GSN every 100 micro seconds after an initial latency. The hardware clock machine, on the receiving end can be configured likewise to have a dedicated thread poll for a dedicated position and write it to the outbound queue. Giving a theoretical max log rate of 10,000. This can be designed into the global cluster.

An Additional Problem and its Resolution

Problem I:

Assume successive GSN values partitioned between two geo-separated clusters are such that per local time (synchronized), the larger GSN is used earlier. i.e. (gsn1 & gsn2 such that gsn2>gsn1 but gsn2 is used in a log flush before gsn1 when lt2 is earlier than lt2). This can be a problem if these log records pertain to updates on same piece of data. This can be resolved by skipping one set of GSN before using it as part of the log flush sequence.

For example, assume there are three-member clusters. C1, C2 and C3. At time interval 3×t, the GSN generator generated gsn1(t), gsn2(t+1) and gsn3(t+3) and at interval 3×(t+1) GSN generated gsn1(t+4), gsn2(t+5) and gsn3(t+6). As long as the first set is used for a log flush once each of the clusters receives the next set of GSN, the ordering of events is guaranteed. Every GSN usage requires two invocation of maxGSN( ) function and the earliest GSN is used after receiving the subsequent GSN.

In general the maxGSN( ) should skip the queue length number of gsn values before picking up a value to be used for ordering events.

Problem II:

A cluster with low transaction rates might have a series of GSN numbers received but only a log flush event relatively infrequently. In such case the max(GSN) value can be used for ordering each cluster-wide log flush.

Figure 7A:
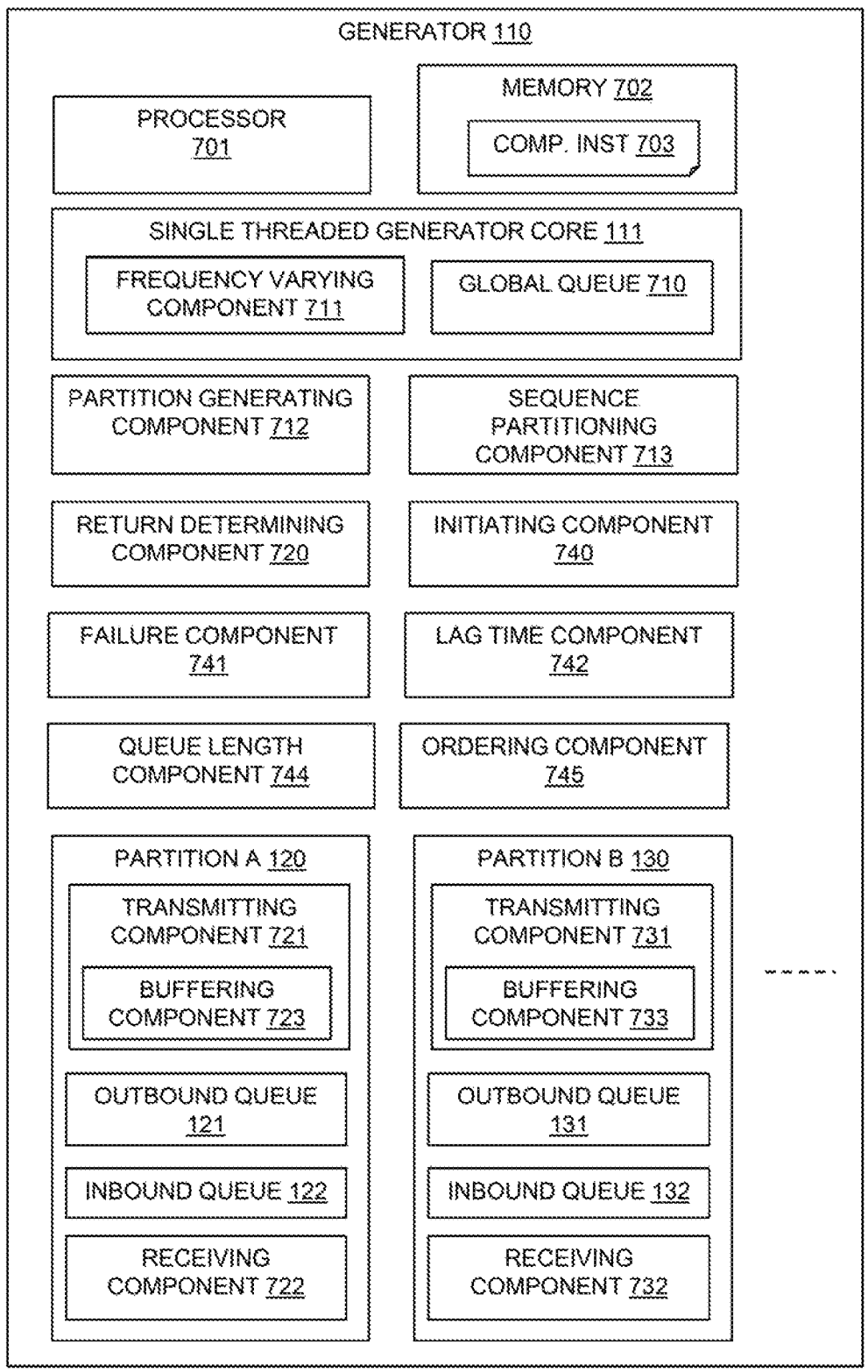
FIG. 7A is block diagram of an example embodiment of a system in accordance with an aspect of the present invention.

Referring to FIG. 7A a block diagram illustrates an example embodiment of a described generator 110.

The generator 110 may include at least one processor 701, a hardware module, or a circuit for executing the functions of the described components which may be software units executing on the at least one processor. Multiple processors running parallel processing threads may be provided enabling parallel processing of some or all of the functions of the components. Memory 702 may be configured to provide computer instructions 703 to the at least one processor 701 to carry out the functionality of the components.

The generator 110 may include a single threaded generator core 111 for generating a single thread global number sequence for a global queue 710 including a frequency varying component 711 for controlling the frequency of number generation.

The generator 110 may a partition generating component 712 for determining a number of remote participating clusters and a sequence partitioning component 713 for partitioning the global number sequence into multiple partitions 120, 130 and each partition having a derived stream with corresponding values provided in each stream.

Each partition 120, 130 may include one or more outbound queues 121, 131 and a corresponding number of inbound queues 122, 132 and a transmitting component 721, 731 for transmitting ordered corresponding values from an outbound queue of each partition to each partition's remote participating cluster and a receiving component 722, 732 for receiving the corresponding values at an inbound queue of each partition. The transmitting component 721, 731 may include a buffering component 723, 733 for buffering corresponding values on outbound queues 121, 131 until it is time to send the next corresponding values.

The generator 110 may include a return determining component 720 such as a polling component for polling the inbound queues 122, 123 to determine that all the corresponding values have been received before transmitting a next set of ordered corresponding values from the outbound queues 121, 131 of the partitions 120, 130. In one embodiment, the generator 110 may include a lag time component 742 for determining lag times of transmission from the generator to each receiver and a queue length component 744 for communicating a queue length to each receiver based on the relative lag times to indicate a number of values in a queue at the receiver to be skipped to obtain a global sequence number. The lag time component 742 may include determining lag times by carrying out a calibration routine for a current arrangement of remote participating clusters by sending test signals to each receiver and averaging the results for each receiver. In such an embodiment, the generator 110 may also include an ordering component 745 for ordering the transmission from an outbound queue of each partition according to the relative lag times.

Further components may be provided at the generator 110 to provide additional functionality including an initiating component 740 for determining if all receivers are online, and a failure component 741 for recovery from a failure.

Figure 7B:
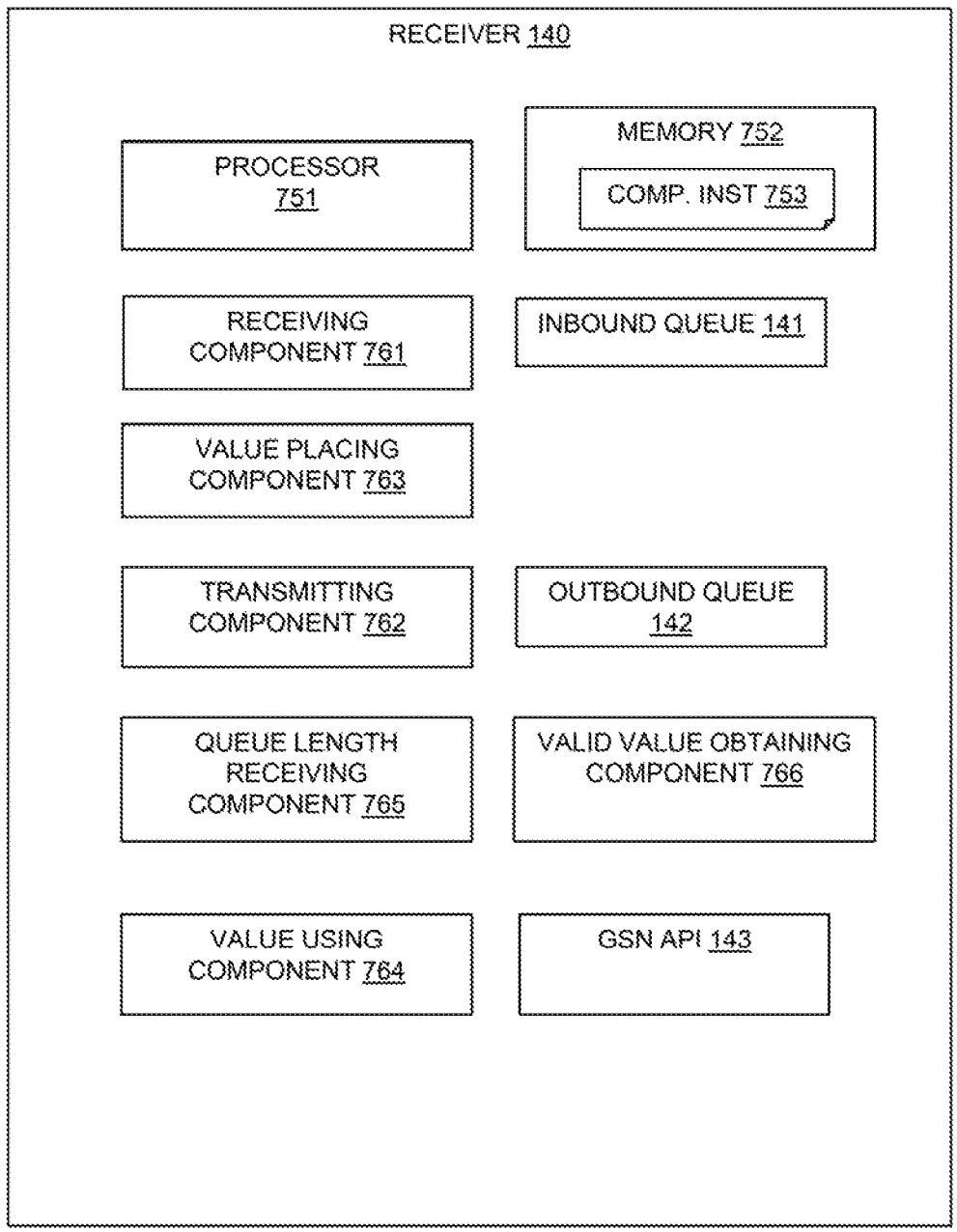
FIG. 7B is block diagram of an example embodiment of a system in accordance with an aspect of the present invention.

Referring to FIG. 7B a block diagram illustrates an example embodiment of a described receiver 140 at a remote participating cluster.

The receiver 140 may include at least one processor 751, a hardware module, or a circuit for executing the functions of the described components which may be software units executing on the at least one processor. Multiple processors running parallel processing threads may be provided enabling parallel processing of some or all of the functions of the components. Memory 752 may be configured to provide computer instructions 753 to the at least one processor 751 to carry out the functionality of the components.

The receiver 140 may include a receiving component 761 for receiving one of a set of ordered corresponding values at an inbound queue 141 at the receiver 140 from a remote sequence generator.

The receiver 140 may include a value placing component 763 for placing the value on an outbound queue 142 and a transmitting component 762 for returning the value to the generator 110.

In one embodiment, the receiver 140 may include a queue length receiving component 765 for receiving a queue length for the receiver from the generator to indicate a number of values in the queue to be skipped to obtain a validated value and a valid value obtaining component 766 for obtaining a valid value by skipping a number of values in the outbound queue according to the queue length.

A value using component 764 may allow users to use the valid values in the outbound queue 142 for ordering events at the cluster and to provide an ordered value across remote participating clusters. A GSN API 143 provided by the receiver 140 to applications in the cluster may provide the GSN values on request.

Figure 8:
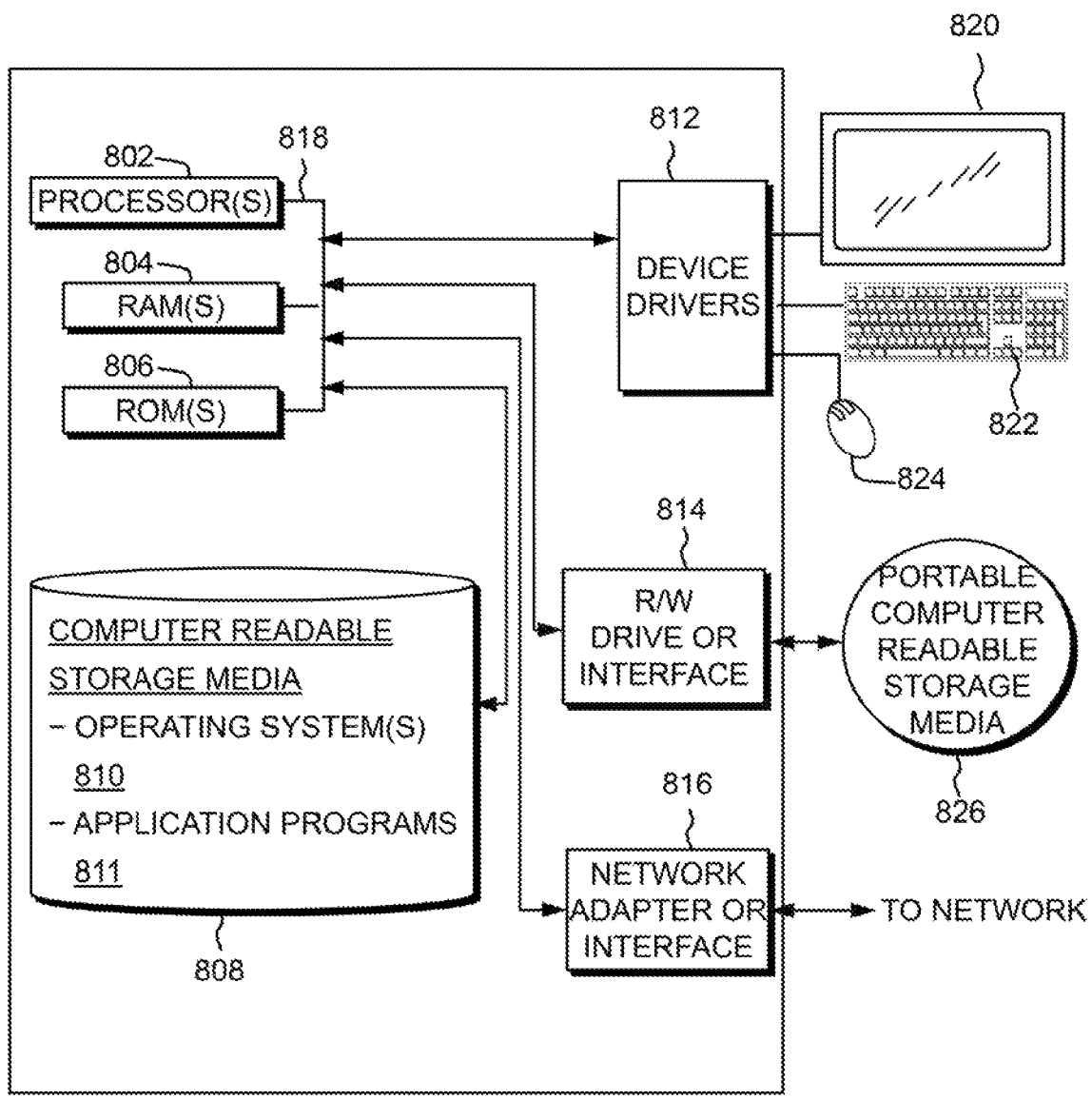
FIG. 8 is a block diagram of an embodiment of a computer system or cloud server in which the present invention may be implemented.

FIG. 8 depicts a block diagram of components of a computing device that may be implemented for the generator 110 or receivers 140, 150 of the system 100 of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device can include one or more processors 802, one or more computer-readable RAMs 804, one or more computer-readable ROMs 806, one or more computer readable storage media 808, device drivers 812, read/write drive or interface 814, and network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within the system.

One or more operating systems 810, and application programs 811, are stored on one or more of the computer readable storage media 808 for execution by one or more of the processors 802 via one or more of the respective RAMs 804 (which typically include cache memory). In the illustrated embodiment, each of the computer readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 814 to read from and write to one or more portable computer readable storage media 826. Application programs 811 on computing device can be stored on one or more of the portable computer readable storage media 826, read via the respective R/W drive or interface 814 and loaded into the respective computer readable storage media 808.

Computing device can also include a network adapter or interface 816, such as a TCP/IP adapter card or wireless communication adapter. Application programs 811 on computing device can be downloaded to the computing device from an external computer or external storage device via a network (for example, the Internet, a local area network or other wide area networks or wireless networks) and network adapter or interface 816. From the network adapter or interface 816, the programs may be loaded into the computer readable storage media 808. The network may comprise copper wires, optical fibers, wireless transmission, routers, firewalls, switches, gateway computers and edge servers.

Computing device can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814, and network adapter or interface 816 can comprise hardware and software stored in computer readable storage media 808 and/or ROM 806.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
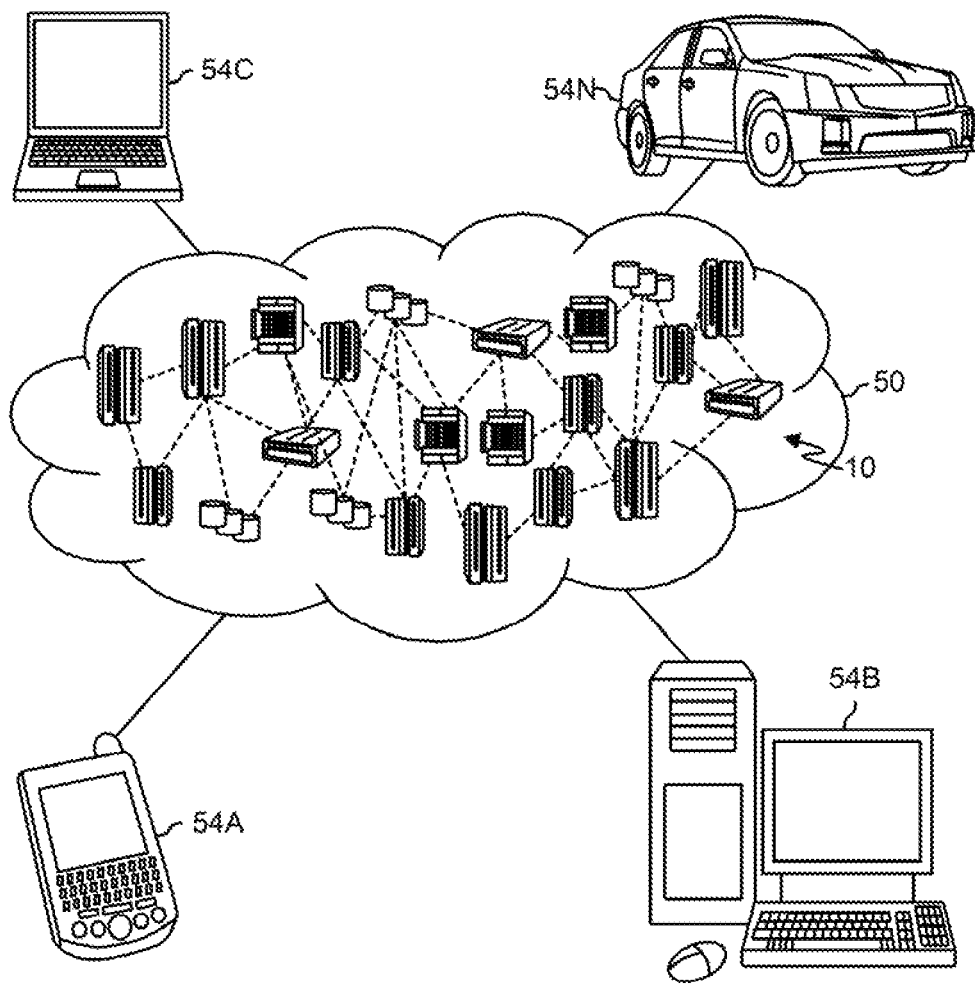
FIG. 9 is a schematic diagram of a cloud computing environment in which the present invention may be implemented.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 10:
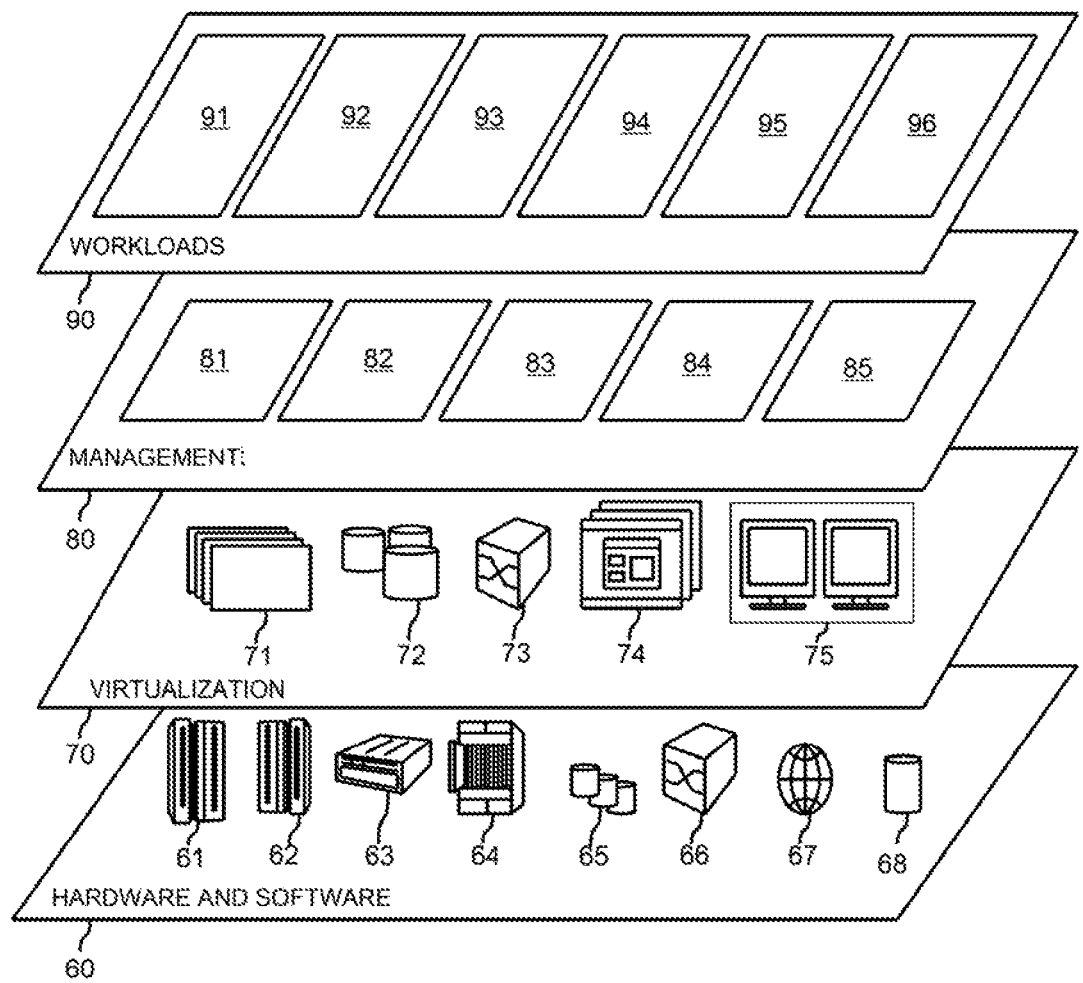
FIG. 10 is a diagram of abstraction model layers of a cloud computing environment in which the present invention may be implemented.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing a distributed clock 96 at a cloud level.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for generation of unique ordering of events at cloud scale, comprising:
   generating a single thread global number sequence at a generator at a controlled frequency of number generation;
   partitioning the global number sequence into multiple partitions with one partition for each remote participating cluster and each partition having a derived stream with an ordered corresponding value provided in each stream of a set of corresponding values;
   transmitting ordered corresponding values of a set from an outbound queue of each partition to a receiver at each partition's remote participating cluster, wherein transmitting ordered corresponding values of a next set continues before all values of a previous set are received back;
   notifying the receivers of a number of most recently received values to be skipped to obtain a valid ordered corresponding value for use as a global sequence number;
   determining that all the ordered corresponding values of a set are received back in order to result in the valid ordered corresponding values; and
   using the valid ordered corresponding values as global sequence numbers to provide a distributed clock across the remote participating clusters, wherein the valid ordered corresponding value is a member of a set of corresponding values that have all been received at their respective receivers.

2. The method as claimed in claim 1, wherein transmitting ordered corresponding values of a next set is delayed until all values of a previous set are received back, and wherein a valid ordered corresponding value at a receiver is a penultimate received value.

3. The method as claimed in claim 1, wherein determining that all the ordered corresponding values of a set are received back determines that they are received back within a deadline else a pause routine is carried out to pause generation and sending of values.

4. The method as claimed in claim 3, further comprising:
   determining lag times of transmission from the generator to each receiver and wherein notifying the receivers of a number of most recently received values to be skipped communicates a queue length to each receiver based on the relative lag times; and
   ordering the transmission from an outbound queue of each partition according to the relative lag times.

5. The method as claimed in claim 4, further comprising determining lag times by carrying out a calibration routine for a current arrangement of remote participating clusters by sending test signals to each receiver and averaging the results for each receiver.

6. The method as claimed in claim 1, wherein the global number sequence is a sequence of natural numbers and the derived streams for each partition are stream of natural numbers based on a modulo value for each partition, and wherein a set of corresponding values includes corresponding modulo multiples in each stream.

7. The method as claimed in claim 1, further comprising transmitting ordered corresponding values from more than one outbound queue of each partition to each partition's remote participating cluster and receiving the corresponding values at more than one inbound queue of each partition.

8. The method as claimed in claim 1, further comprising providing an application programming interface for the receiver at each remote cluster and wherein the receiver uses the application programming interface to provide its global sequence numbers to applications in the cluster.

9. The method as claimed in claim 1, wherein if a value is not received on an inbound queue of a partition for a remote participating cluster in a pre-configured interval of time, the partition is suspended and the remaining partitions used.

10. A computer-implemented method for generation of unique ordering of events at cloud scale carried out at a receiver at a remote participating cluster, comprising:
    receiving one of a set of ordered corresponding values at an inbound queue at the receiver from a remote sequence generator;
    placing the value on an outbound queue for return to the generator;
    wherein the set of ordered corresponding values are from derived streams of a single thread global number sequence generated at the generator at a controlled frequency of number generation, and wherein the global number sequence is partitioned into derived streams for each remote participating cluster;
    receiving a queue length for the receiver from the generator to indicate a number of values in the queue to be skipped to obtain a valid value; and
    obtaining a valid value by skipping a number of values in the outbound queue according to the queue length; and
    using the valid values in the outbound queue for ordering events at the cluster and as a global sequence number to provide an ordered value across remote participating clusters, wherein valid values are values where all corresponding values of a set have been received at other remote participating clusters.

11. A computer system for generation of unique ordering of events at cloud scale, the computer system comprising:
    one or more processors, one or more computer-readable memories, one or more computer-readable storage media, and program instructions stored on at least one of the one or more storage media for execution by at least one of the one or more processors via at least one of the one or more memories, the program instructions comprising program instructions for:
    generating a single thread global number sequence at a generator at a controlled frequency of number generation;
    partitioning the global number sequence into multiple partitions with one partition for each remote participating cluster and each partition having a derived stream with an ordered corresponding value provided in each stream of a set of corresponding values;
    transmitting ordered corresponding values of a set from an outbound queue of each partition to a receiver at each partition's remote participating cluster, wherein transmitting ordered corresponding values of a next set continues before all values of a previous set are received back;

notifying the receivers of a number of most recently received values to be skipped to obtain a valid ordered corresponding value for use as a global sequence number;

determining that all the ordered corresponding values of a set are received back in order to result in the valid ordered corresponding values; and using the valid ordered corresponding values as global sequence numbers to provide a distributed clock across the remote participating clusters, wherein the valid ordered corresponding value is a member of a set of corresponding values that have all been received at their respective receivers.

12. The system as claimed in claim 11, wherein transmitting ordered corresponding values of a next set is delayed until all values of a previous set are received back, and wherein a valid ordered corresponding value at a receiver is a penultimate received value.

13. The system as claimed in claim 11, wherein-determining that all the ordered corresponding values of a set are received back determines that they are received back within a deadline else a pause routine is carried out to pause generation and sending of values.

14. The system as claimed in claim 13, further comprising:

determining lag times of transmission from the generator to each receiver and wherein notifying the receivers of a number of most recently received values to be skipped communicates a queue length to each receiver based on the relative lag times; and ordering the transmission from an outbound queue of each partition according to the relative lag times.

15. The system as claimed in claim 14, further comprising determining lag times by carrying out a calibration routine for a current arrangement of remote participating clusters by sending test signals to each receiver and averaging the results for each receiver.

16. The system as claimed in claim 11, wherein the global number sequence is a sequence of natural numbers and the derived streams for each partition are stream of natural numbers based on a modulo value for each partition, and wherein a set of corresponding values includes corresponding modulo multiples in each stream.

17. The system as claimed in claim 11, further comprising transmitting ordered corresponding values from more than one outbound queue of each partition to each partition's remote participating cluster and receiving the corresponding values at more than one inbound queue of each partition.

18. The system as claimed in claim 11, further comprising providing an application programming interface for the receiver at each remote cluster and wherein the receiver uses the application programming interface to provide its global sequence numbers to applications in the cluster.

19. The system as claimed in claim 11, wherein if a value is not received on an inbound queue of a partition for a remote participating cluster in a pre-configured interval of time, the partition is suspended and the remaining partitions used.

* * * * *